Dec. 26, 1922.
J. F. DUBY,
GAUGE FOR VEHICLE WHEELS.
FILED FEB. 21, 1921.
1,440,067
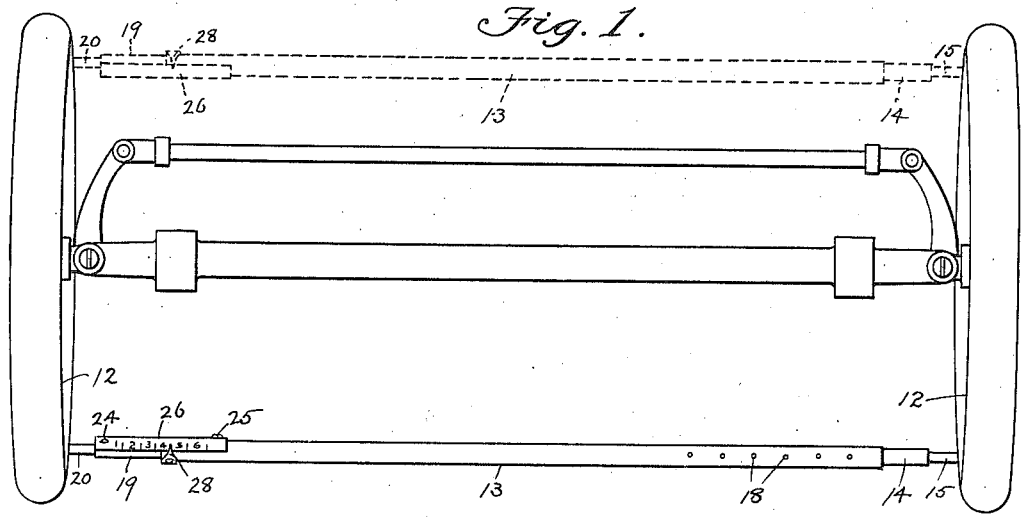
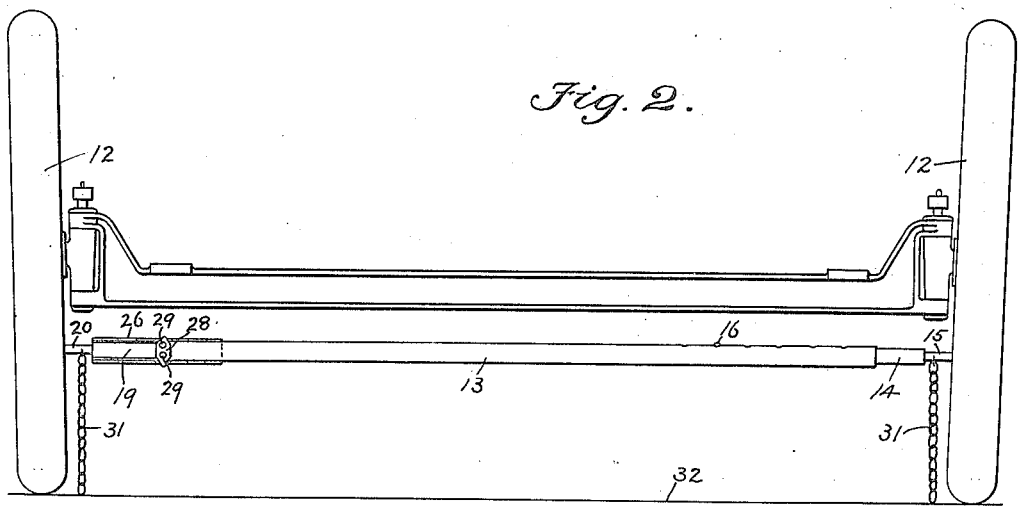
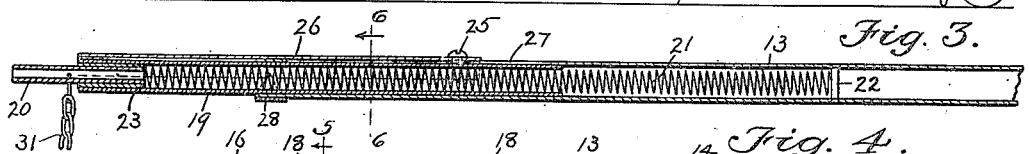
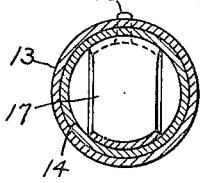
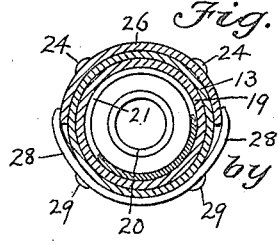
Inventor
John F. Duby
by Wright Brown Quinby May
Attorneys Patented Dec. 26, 1922.

1,440,067

UNITED STATES PATENT OFFICE.

JOHN F. DUBY, OF BOSTON, MASSACHUSETTS.

GAUGE FOR VEHICLE WHEELS.

Application filed February 21, 1921. Serial No. 446,605.

*To all whom it may concern:*

Be it known that I, JOHN F. DUBY, a citizen of the United States, residing at Boston, in the county of Suffolk and State of Massachusetts, have invented new and useful Improvements in Gauges for Vehicle Wheels, of which the following is a specification.

This invention relates to a gauge or instrument whereby the wheels of vehicles may be trued up and brought into alinement or parallelism, the object, when rubber tired wheels are used, being to prevent objectionable wear of the tires due to misalinement or deviation from the proper plane of rotation.

The invention has for its object to provide an improved gauge capable of being used in connection with either front or rear wheels, irrespective of the size of the wheels and their tires, and of indicating in plain sight of the operator the condition of the wheels as to alinement.

To these and other related ends the invention consists in the improvements which I will now proceed to describe and claim.

Of the accompanying drawings forming a part of this specification,—

Figure 1 is a plan view of a gauge embodying the invention, applied to a pair of front wheels.

Figure 2 is a front view of the same.

Figures 3 and 4 are fragmentary longitudinal sections, collectively showing the entire length of the gauge.

Figure 5 is an enlarged section on line 5—5 of Figure 4.

Figure 6 is an enlarged section on line 6—6 of Figure 3.

The same reference characters indicate the same parts in all of the figures.

My improved wheel gauge comprises an adjustable body, adapted to be extended to a length greater than the distance between corresponding points on two wheels 12, to be tested, and to be shortened to the exact distance between said points. The body is composed of two members, preferably tubular, one being adapted to slide within or upon the other, and each member is provided with a terminal at its outer end. Said terminals are adapted to bear simultaneously on portions of the inner sides of the wheels 12, said portions being preferably the tires, although they may be the felloes, or other portions. A spring is preferably employed to yieldingly maintain the body at a length greater than the distance between the wheel points on which the terminals bear, and to hold said terminals in yielding engagement with the wheels. One of the body members is preferably composed of sections which are adjustable, to vary the length of the member, and is provided with means for locking said sections together to maintain any adjusted length of said member.

The body is provided with means for indicating the distance between the terminals, and with height-indicating pendants adapted to extend from the body to the floor or other base on which the wheels rest, to show when the points with which the terminals are engaged are suitably elevated above the base.

I will now describe the preferred embodiment of the invention shown by the drawings.

The sectional body member of variable length is composed of an outer tube 13, and an inner tube 14, slidable in the outer tube and provided with a reduced terminal 15, which is preferably a short tube of smaller diameter than the inner tube 13, and rigidly secured to the latter, the form of said terminal and the opposite terminal 20, hereinafter described being such that said terminals are adapted to have a frictional and non-slipping engagement with the inner surfaces of the tires, or other wheel portions, against which they are pressed, so that the gauge may be supported above a base on which the wheels rest, and may be transferred by the rotation of said wheels from a position at one side of the axis of the wheels to a position at the opposite side of said axis. A detent 16, carried by a spring 17, fixed to the inner tube 14, is projected by the spring through an orifice in the inner tube, and into any of a series of orifices 18, in the outer tube 13.

The other body member is continuous and is composed of a tube 19 slidable in the outer tube 13, and provided with a terminal 20, similar to the terminal 15. A spring 21, seated at one end on an abutment 22 in the tube 13, and at the other end on an abutment 23 in the tube 19, yieldingly maintains the adjustable body at a maximum elongation, and presses the terminals 15 and 20 yieldingly against the wheel portions between which they are interposed.

To the tube 19 is fixed by screws 24 and 25, a graduated scale plate 26 of arcuate form in cross section, a portion of said plate overlapping a portion of the tube 13. The plate 26 has two graduated scales, one located at one side, and the other at the opposite side of the body, as indicated by Figure 2. The screw 25 extends through a longitudinal slot 27 (Figure 3) in the tube 13.

To the tube 13 is fixed by screws 29 are two pointers 28, which cooperate with the scales on the plate 26, as indicated by Figures 1 and 2, one pointer overlapping one scale, and the other overlapping the other scale, so that two scales and two pointers are provided, one scale and pointer being visible from one side of the body, and the other scale and pointer from the opposite side. The body is provided at its opposite end portions with flexible pendants 31, which are preferably short chains attached to the terminals 15 and 20, and adapted to bear on a floor or other base 32 on which the wheels rest, to indicate when the gauge is at a suitable elevation above said base. The pendants are transferable with the gauge from side to side of the axis of the wheels, and indicate the height of the gauge when the latter is in either of the positions shown by Figure 1. The gauge may be operated as follows:

The sections 13 and 14 of the adjustable member being adjusted to give the gauge body a normal length greater than the distance between the wheels 12, the operator contracts the gauge (this contraction being permitted by the spring 21), and interposes it between the wheels, the terminals 15 and 20 being applied to corresponding points on the wheels and pressed against the wheels by the spring. The height of the gauge when applied to the wheels, for the first reading, should be such that the pendants 31 barely touch the base 32. The operator then, by reading the scale and pointer, at the upper side of the gauge, notes the distance between the terminals and the wheel points engaged thereby.

After this, without removing the gauge, the operator moves the vehicle, causing the wheels to turn until the gauge is transferred from the position shown by full lines at one side of the axis of the wheels, to the position shown by dotted lines at the opposite side of said axis, the wheels being stopped when the pendants again barely touch the base. The operator may now note by again reading the scale and pointer at the upper side of the gauge, whether there is any variation from the first reading. The gauge is semi-rotated by its transference from one of the above-mentioned positions to the other, and the arrangement of the duplicate scales and pointers is such that a scale and a pointer are visible at the upper side of the gauge when the latter is in either of said positions.

Figures 1 and 2 show the gauge used with the front wheels of a motor vehicle. It is obvious that the gauge may be used in the same way with the rear wheels.

An advantage of this gauge is the fact that two or more readings may be taken without removing the gauge from the wheels, so that there is no chance of error which might be caused by a lump on, or a depression in the surface of a wheel.

The pendants enable the operator to be sure that the gauge is at exactly the same height above the base at both readings. This is especially important when the wheels are inclined relatively to each other, as is usually the case with front wheels, as shown by Figures 1 and 2.

The employment of two scales and pointers enables the operator to conveniently read the indication, when the gauge is in each of the positions shown by Figure 1, one scale and pointer being moved out of the operator's line of vision, and the other moved into the same during the transfer of the gauge from one position to the other.

I am not limited to the specific mechanism of the preferred embodiment of my improvements shown by the drawings, except as otherwise required in certain of the more limited claims.

I regard any construction of the body providing two parallel members slidable lengthwise relatively to each other, to render the body adjustable as to its length, as within the scope of my invention as defined by the appended claims.

I claim:

1. A wheel gauge comprising an adjustable body composed of members relatively movable to lengthen and shorten the body, said members having coaxial terminals, adapted to bear simultaneously on the inner sides of two wheels between which the gauge is interposed, and formed to have a non-slipping engagement with said wheels, so that the body may be supported above a base on which the wheels rest, and may be transferred by the rotation of said wheels from a position at one side of the axis of the wheels to a position at the opposite side, and means on the body for indicating the distance between said terminals, said means being visible at the upper side of the body when the latter is in either of said positions.

2. A wheel-gauge comprising an adjustable body composed of members relatively movable to lengthen and shorten the body, said members having coaxial terminals, adapted to bear simultaneously on the inner sides of two wheels between which the gauge is interposed, and formed to have a non-slipping engagement with said wheels, so that the body may be supported above a base on which the wheels rest, and may be transferred by the rotation of said wheels from a position at one side of the axis of the wheels to a position at the opposite side, duplicated graduated scales on opposite sides of one member, and duplicate pointers fixed to the other member and arranged to cooperate with said scales, the body being semi-rotated by its transference, and the arrangement being such that in each of said positions a scale and a pointer are visible at the upper side of the body.

3. A wheel-gauge comprising an adjustable body composed of members relatively movable to lengthen and shorten the body, said members having coaxial terminals, adapted to bear simultaneously on the inner sides of two wheels between which the gauge is interposed, and formed to have a non-slipping engagement with said wheels, so that the body may be supported above a base on which the wheels rest, and may be transferred by the rotation of said wheels from a position at one side of the axis of the wheels to a position at the opposite side, means on the body for indicating the distance between said terminals, and flexible height-indicating pendants connected with said members at opposite ends of the body, and adapted to extend from the body to a base supporting said wheels, said pendants being transferable with the body from side to side of the axis of the wheels, and indicating the height of the body when the latter is in either of said positions.

4. A wheel-gauge comprising an adjustable body composed of members relatively movable to shorten and lengthen the body, and provided with alined terminals adapted to bear simultaneously on, and have a non-slipping engagement with the inner sides of two wheels between which the gauge is interposed; means on the body for indicating the distance between said terminals, one of said members being continuous and having a spring abutment, and the other member being composed of sections which are relatively movable to vary its length, and are provided with means for locking the sections together at different length-varying adjustments, one of said sections having a spring abutment; and a spring interposed between said abutments and yieldingly maintaining a maximum elongation of the body.

In testimony whereof I have affixed my signature.

JOHN F. DUBY.